United States Patent
Cromp et al.

(10) Patent No.: US 11,988,804 B2
(45) Date of Patent: May 21, 2024

(54) RULE-BASED ENVIRONMENTAL CONDITION IMPACT ASSESSMENTS

(71) Applicant: Raytheon Company, Tewksbury, MA (US)

(72) Inventors: Robert F. Cromp, Clifton, VA (US);
Caleb N. Sherer, Tucson, AZ (US);
Kendall L. Hefley, Royse City, TX (US)

(73) Assignee: Raytheon Company, Tewksbury, MA (US)

( * ) Notice: Subject to any disclaimer, the term of this patent is extended or adjusted under 35 U.S.C. 154(b) by 320 days.

(21) Appl. No.: 17/174,974

(22) Filed: Feb. 12, 2021

(65) Prior Publication Data
US 2022/0260749 A1 Aug. 18, 2022

(51) Int. Cl.
*G01W 1/10* (2006.01)
*G06F 3/04817* (2022.01)
*G06N 5/01* (2023.01)

(52) U.S. Cl.
CPC .......... *G01W 1/10* (2013.01); *G06F 3/04817* (2013.01); *G06N 5/01* (2023.01)

(58) Field of Classification Search
CPC ...... G01W 1/10; G06F 3/04817; G06N 5/003
USPC ........................................................... 702/3
See application file for complete search history.

(56) References Cited

U.S. PATENT DOCUMENTS

| 9,437,170 | B1 | 9/2016 | Quevedo Montesdeoca | |
|---|---|---|---|---|
| 2008/0180282 | A1* | 7/2008 | Brosius | G01C 21/00 340/995.27 |
| 2012/0303278 | A1 | 11/2012 | Dannevik et al. | |
| 2016/0155340 | A1 | 6/2016 | Watts | |
| 2016/0164748 | A1* | 6/2016 | Kim | H04L 12/403 706/47 |
| 2016/0307446 | A1 | 10/2016 | Edakunni et al. | |
| 2018/0218303 | A1 | 8/2018 | Cole et al. | |
| 2020/0142419 | A1* | 5/2020 | Pohl | G05D 1/0278 |
| 2020/0166356 | A1* | 5/2020 | Beaurepaire | B60L 58/12 |
| 2020/0175628 | A1 | 6/2020 | Srinivasan et al. | |
| 2021/0173118 | A1* | 6/2021 | Nishiyama | G01W 1/10 |

FOREIGN PATENT DOCUMENTS

WO   WO-2022173934 A1   8/2022

OTHER PUBLICATIONS

Brandt, Second Generation Weather Impacts Decision Aid Applications and Web Services Overview (Year: 2013).*

(Continued)

*Primary Examiner* — Mohamed Charioui
*Assistant Examiner* — Dacthang P Ngo
(74) *Attorney, Agent, or Firm* — Schwegman Lundberg & Woessner, P.A.

(57) ABSTRACT

Discussed herein are devices, systems, and methods for rule-based weather impact assessment. A method can include receiving, by a user interface, a request for environmental condition impact data for specified equipment at a specified location, retrieving weather model data for the specified location, comparing the retrieved weather model data to user-defined rules associated with the specified equipment, and providing, by the user interface, a graphic depiction indicating whether the user-defined rule is satisfied in the specified location based on the comparison.

18 Claims, 6 Drawing Sheets

(56) References Cited

OTHER PUBLICATIONS

"International Application Serial No. PCT/US2022/015958, International Search Report dated May 6, 2022", 4 pgs.
"International Application Serial No. PCT/US2022/015958, Written Opinion dated May 6, 2022", 6 pgs.
Sauter, D, et al., "The integrated weather effects decision aid: a common software tool to assist in command and control decision making", U.S. Army Research Laboratory, [Online]. Retrieved from the Internet: < URL: https://apps.dtic.mil/sti/pdfs/ADA458099.pdf>, (1999), 9 pgs.
"International Application Serial No. PCT/US2022/015958, International Preliminary Report on Patentability dated Aug. 24, 2023", 8 pgs.

* cited by examiner

RULE-BASED ENVIRONMENTAL CONDITION IMPACT ASSESSMENTS

TECHNICAL FIELD

Embodiments discussed herein regard devices, systems, and methods for environmental condition impact intelligence. The environmental condition impact intelligence can be rule-based, geographically constrained, and equipment specific.

BACKGROUND

An entity typically will make weather considerations based on intuition. For example, a person considering traveling from a first location to a second location will seek out a weather forecast provided by a website, app, a television show, radio, or the like. Then, based on the forecast, the user will make a personal decision as to whether to travel. A similar process is used whether the entity is a person, company, organization, or the like.

DETAILED DESCRIPTION

Various entities adjust their operations based on the current and predicted environmental conditions. These environmental conditions can include meteorological (e.g., current or predicted weather) and astronomical factors (e.g., illumination due to moon phase, among others). Some meteorological parameters are provided through sensor readings, model operations, or ephemeris data. Other environmental condition parameters can be derived. Teachings of this disclosure provide users an ability to define impact rules. The impact rules define constraints against environmental condition parameters. The constraints are relative to aspects of operations. Examples of operations include package delivery, vehicle or other object travel, flight planning, intelligence gathering, among other weather-impacted operations. The teachings provide an impact graphic that concisely shows the impact of current and projected environmental conditions on user-equipment based on the defined impact rules.

Figure 1:
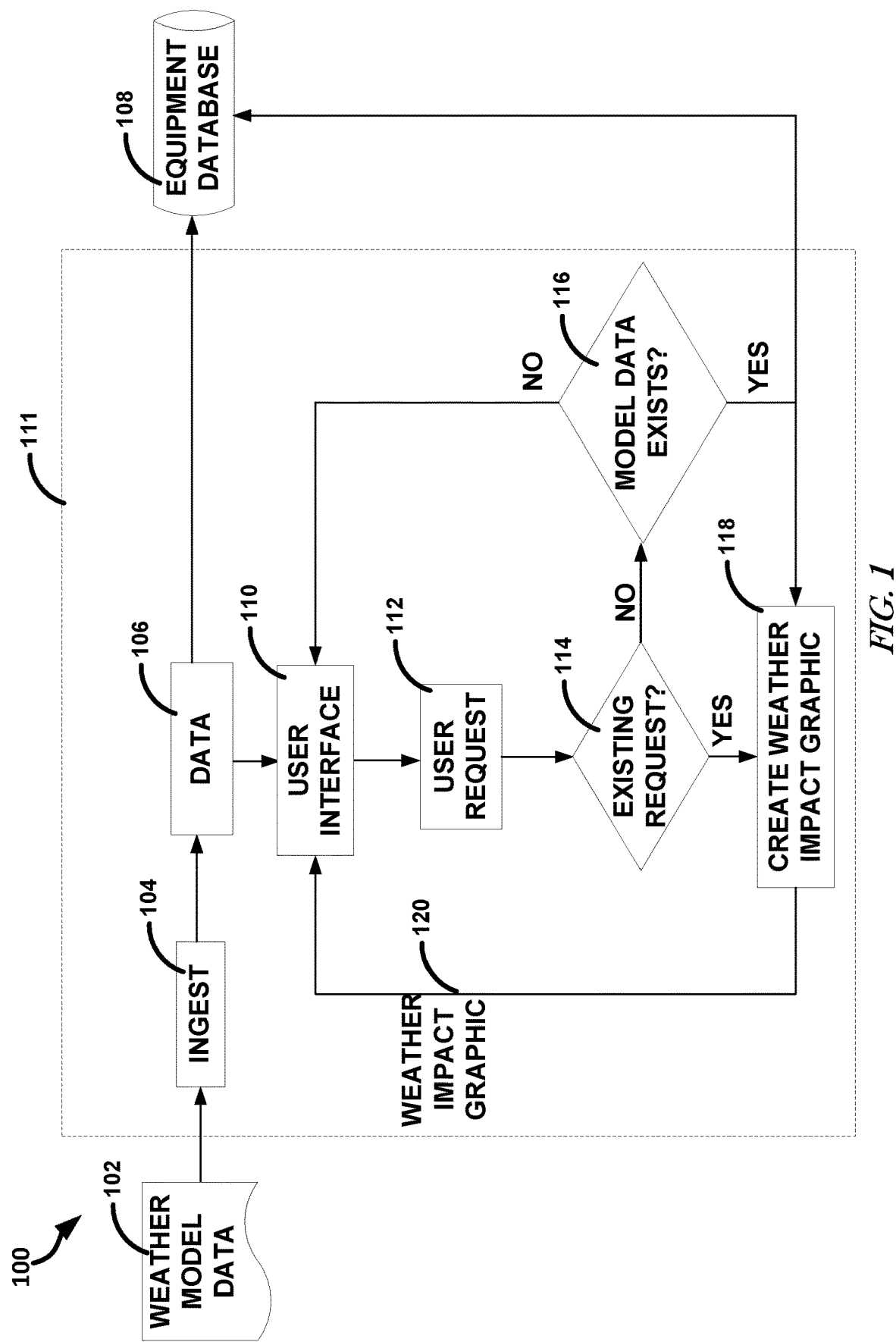
FIG. 1 illustrates, by way of example, a diagram of a system for rule-based environmental condition impact assessments.

FIG. 1 illustrates, by way of example, a diagram of a system 100 for rule-based environmental condition impact assessments. The system 100 as illustrated includes weather model data 102 input into an ingest operation 104. The ingest operation 104 can extract data 106 from the weather model data 102. The data 106 can be provided to an equipment database 108 and a user interface 110. The user interface 110 can provide a way for a user to submit a weather impact request 112. The user interface 110 can provide an environmental condition impact graphic 118 to the user, such as on a display, or through a text message, email, alert, or other notification.

The weather model data 102 can include gridded binary data (GRIB), such as edition 1 (GRIB1) or edition 2 (GRIB2) data, sensor data, terrain, land cover, illumination, or other equipment operation-related data available to the ingest operation. GRIB data is in GRIB format and conforms with the GRIB standard which is maintained by the World Meteorological Society (WMS). GRIB data is provided in a grid. The grid includes vertices that represent geographical locations on Earth's surface. The grid includes weather data for each vertex indicating output of a weather prediction model (if such data is available).

Typical GRIB data includes wind speed, wind direction, wind gusts, rainfall, wave height, temperature, ozone concentration, dewpoint, relative humidity, sky coverage (e.g., how much cloud cover), ceiling, visibility, or the like. Typical distance between grid points in GRIB data equates to about 15 nautical miles (but this can vary to greater or lesser distances).

The data 106 that is extracted by the ingest operation 104 can be provided to the equipment database 108 and the user interface 110. The equipment database 108 stores user-defined or automatically generated criteria regarding their equipment. The equipment database 108 further stores the data 106. The equipment can include a vehicle or a fleet of vehicles, such as manned, unmanned, or partially manned vehicle, such as a car, truck, or other land vehicle, a ship, boat, submarine, or other water vehicle, a plane, drone, helicopter, satellite, or other air vehicle, or a combination thereof. The equipment can include a sensor, actuator, or effector. A vehicle may be maneuverable for a. set of weather conditions, but other equipment on that vehicle may be adversely impacted. Teachings can consider the vehicle and equipment thereon or otherwise associated therewith.

The user interface 110 translates data received from the user to operations understandable by processing circuitry 111. The user interface 110 is a sort of application programming interface (API) with a user-facing side and a processing circuitry 111 facing side. The user can issue a request 112 for weather impact data (see FIG. 3 for an example of a weather impact graphic) or can generate a rule to be applied to their equipment (see FIG. 4 for an example of a rule-generating interface).

The processing circuitry 111 can receive the user request 112 and generate an environmental condition impact graphic 120. The weather impact graphic 120 can detail, for each user equipment and each location of interest for the user (if such weather data is available), a graphic indicating whether operation of the user equipment is favorable, marginal, or unfavorable. "Favorable" means that the rule the user defined to indicate that environmental conditions will not impact operating conditions was satisfied. "Marginal" means that the rule the user defined to indicate that environmental conditions might impact operating conditions was satisfied. "Unfavorable" means that the rule the user defined to indicate that environmental conditions are very likely to impact operating conditions was satisfied.

The location can comprise a set of areas or regions (e.g., on land, in air (e.g., by air corridors or airstreams), in or on water, in space, or a combination thereof). The set of areas or regions can be contiguous. The set of areas or regions can be on a path between a starting location and a destination location.

The processing circuitry 111 can determine whether a request for the same environmental condition impact data was previously received and satisfied at operation 114, If the request 112 was previously received and satisfied or the request 112 is a subset of a previously received and satisfied request, the processing circuitry 111 can create the environmental condition impact graphic 120 at operation 118. If the request was not previously received and satisfied or the request 112 is not a subset of a previously received and satisfied request, the processing circuitry 111 can determine whether weather model data exists to satisfy the request, at operation 116.

If, at operation 116, the processing circuitry 111 determines that no such model data exists (because the weather model 102 does not exist for whatever reason), the processing circuitry 111 cause the user interface 110 to provide an indication that the weather data does not exist. If, at operation 116, the processing circuitry 111 determines that the weather model data exists, the processing circuitry 111 can retrieve the data from the equipment database 108.

The processing circuitry 111 can generate the environmental condition impact graphic 120 at operation 118. The environmental condition impact graphic 120 can include a depiction, whether in image format, text format, or a combination thereof. An example of an environmental condition impact graphic 120 is provided in FIG. 3. The environmental condition impact graphic 120 can include the weather model data 102, environmental condition parameters derived from the weather model data 102, an indication of the level of severity of the most severe rule satisfied by the weather data 106 for each piece of equipment, an indication of the rule corresponding to the most severe rule satisfied by the weather data 106 for each piece of equipment, or a combination thereof The examples of "favorable", "marginal", and "unfavorable" increase in severity in that order. Thus, if a first weather rule for a first piece of equipment yields a favorable operating condition and a second weather rule for the first piece of equipment yields a marginal or unfavorable operating condition, the indication will be marginal or unfavorable.

The indication of the rule satisfied can be user-configurable. For example, if the equipment is a drone and the drone is not operable in precipitation, the rule can be named "precip". The weather impact graphic 120 can indicate "precip" on the graphic in a timeslot that has a forecast of precipitation greater than 0.

The system 100 can apply user-supplied impact rules to environmental source data e.g., weather, land cover, illumination, or the like). The system 100 can produce a location-specific time-sensitive weather impact graphic that succinctly summarizes the impact of the environmental conditions on the equipment. The weather graphic can be automatically (e.g., without human interference after deployment) updated responsive to receiving new weather model data for the location of concern. The system 100 can generate an alert if a time slot changes to an unfavorable impact where previously conditions had been favorable (likewise, marginal). Similarly, a change from unfavorable to favorable can cause an alert to be issued by the system 110. Such an alert can allow the user to re-plan as desired.

Figure 2:
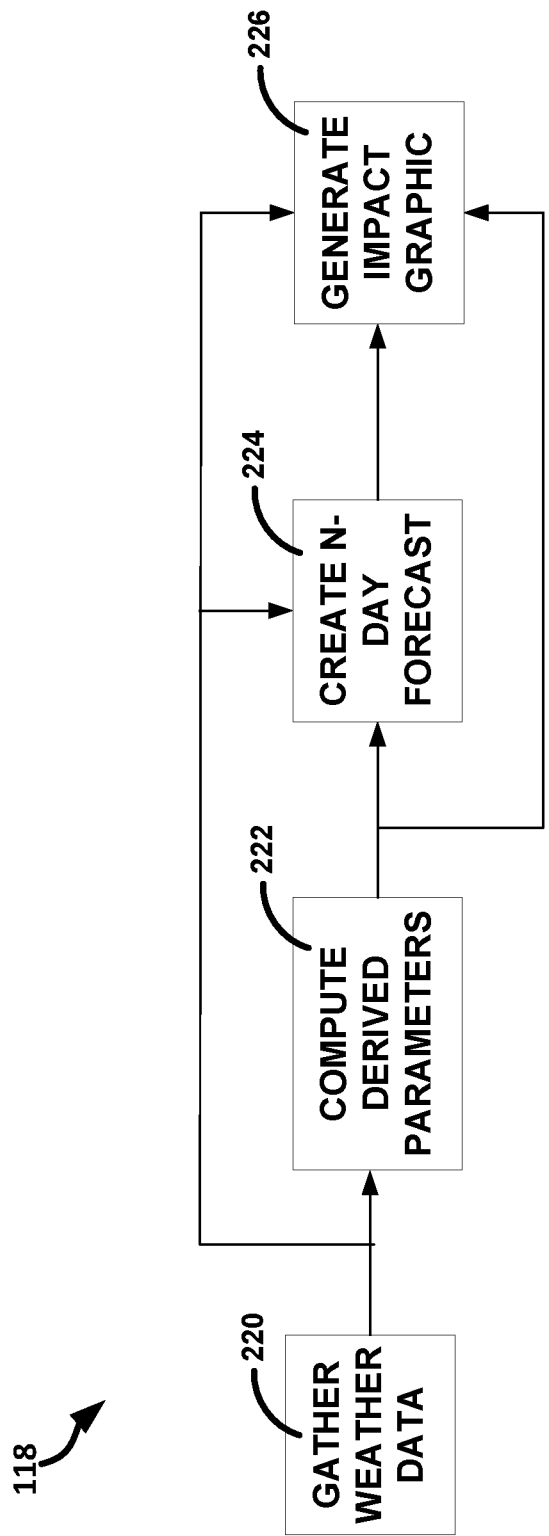
FIG. 2 illustrates, by way of example, a diagram of a flowchart for generating an environmental condition impact graphic.

FIG. 2 illustrates, by way of example, a diagram of a flowchart for generating an environmental condition impact graphic (e.g., the operation 118). The operation 118 as illustrated includes gathering weather data at operation 220.

The weather data can include the data 106 stored in the equipment database 108. The operation 220 can include generating a query to the database 108 for environmental condition data in a specified location at a specified time or range of times. The environmental condition data can be returned by the database 108. The environmental condition data can include the weather model data 102 that satisfies the conditions of the request.

At operation 222, the processing circuitry 111 can compute derived weather parameters. Derived weather parameters are those environmental conditions that can be of interest to the user but are not provided directly by the weather model data 102. Example derived weather parameters include heat index, wind chill, pressure altitude, density altitude, or the like.

At operation 224, the processing circuitry 111 can generate an N-day forecast, where N is an integer greater than zero. The N-day forecast can include derived weather parameters from operation 222, gathered weather data 220, or a combination thereof, for each of the N days. The forecast for a given day can include astronomical-related events, such as sunrise, sunset, moonrise, moonset, begin morning nautical twilight (BMNT), end evening nautical twilight (EENT), or the like.

The data gathered at operation 220, derived parameters computed at operation 222, the N-day forecast generated at operation 224, or a combination thereof, can be used to generate the impact graphic 120 at operation 226. Generating the impact graphic 120 can include organizing, formatting, or otherwise generating a visual or textual representation of the impact of the weather on equipment based on rules. An example of a weather impact graphic 120 is provided in FIG. 3.

Figure 3:
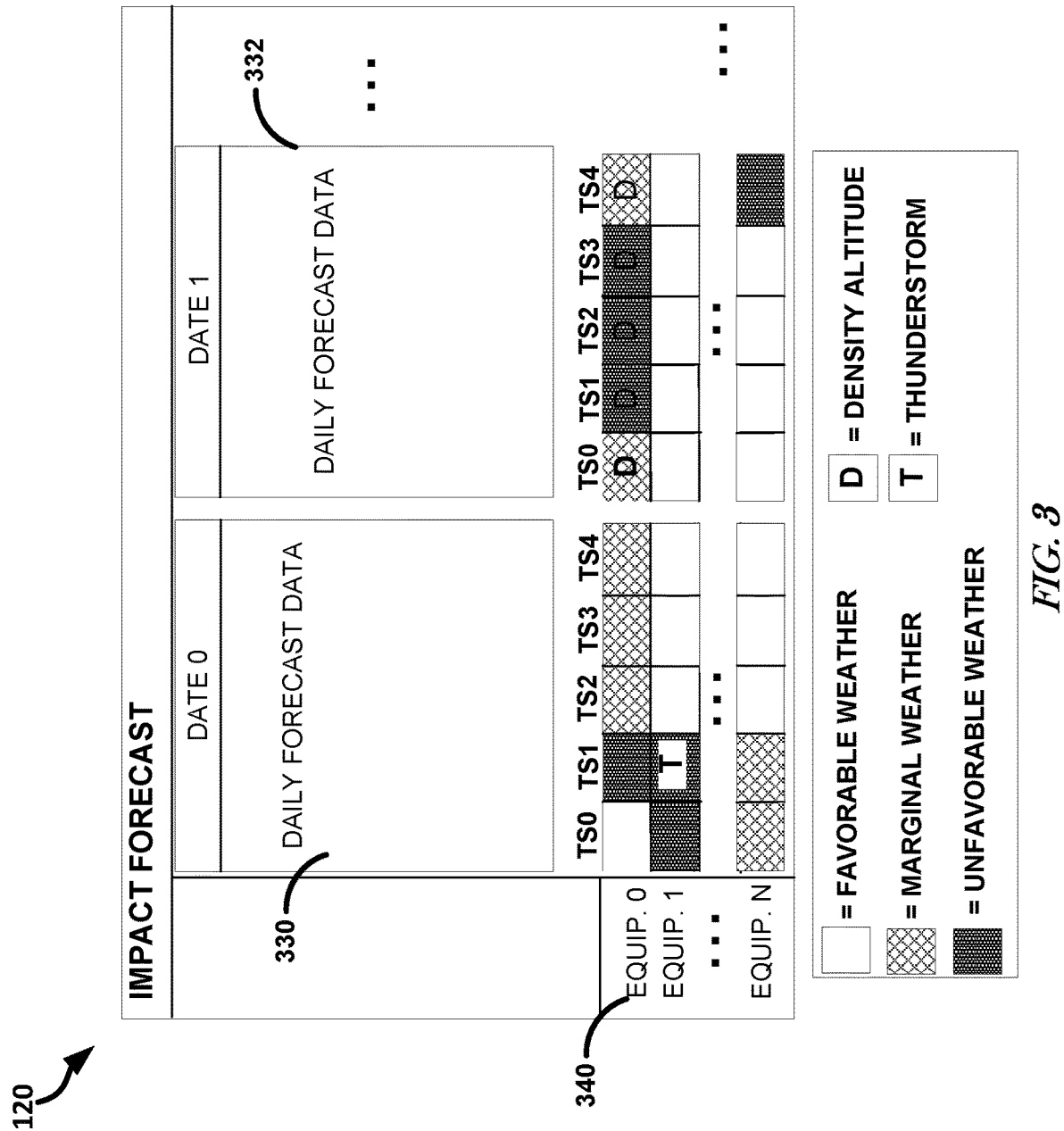
FIG. 3 illustrates, by way of example, a diagram of an environmental condition impact graphic.

FIG. 3 illustrates, by way of example, a diagram of a weather impact graphic 120. The environmental condition impact graphic 120 as illustrated includes daily forecasts 330, 332 for each of the N-days. The weather forecasts 330, 332 include data indicating one or more of the gathered weather data from operation 220, computed derived parameters from operation 222, or a combination thereof. The forecast 330, 332 can be created at operation 224.

The environmental condition impact graphic 120 can illustrate a weather impact timeline for each piece of equipment 330 of interest to the user request 112 for which there is at least one rule defined in the database 108. The environmental condition impact, timeline is comprised of timeslots, TS1, TS2, TS3. TS4 in FIG. 3. Each of the timeslots can correspond to a time range that is commensurate with (e.g., same as or a subset of) the weather model data 102. Each of the timeslots can indicate whether, based on the user-defined rules, the weather is favorable, marginal, or unfavorable. Each of the timeslots can further indicate a reason for the marginal or unfavorable indication.

In the example of FIG. 3, the timeslot, TS4 for equipment 0 on date 1 is indicated as marginal. This timeslot further includes a symbol indicating the user-defined rule that caused the marginal indication. In this case, the character is "D" and can correspond to "density altitude" or other environmental condition-related rule and user-defined symbol. In the example of FIG. 3, the timeslot, TS1 for equipment 1 on date 0 is unfavorable, with a symbol of "T" that indicates the condition that caused the rule to be unfavorable for operation of the equipment 1. This can be because the user has set the environmental condition impact graphic 120 to indicate when a thunderstorm makes operation of the equipment 1 unfavorable.

In the instance of FIG. 3, the timeslot, TS4 for equipment 1 on date 1 is indicated as favorable. The favorable indication can be reserved for equipment for which no rules associated therewith are determined to be marginal or unfavorable.

Figure 4:
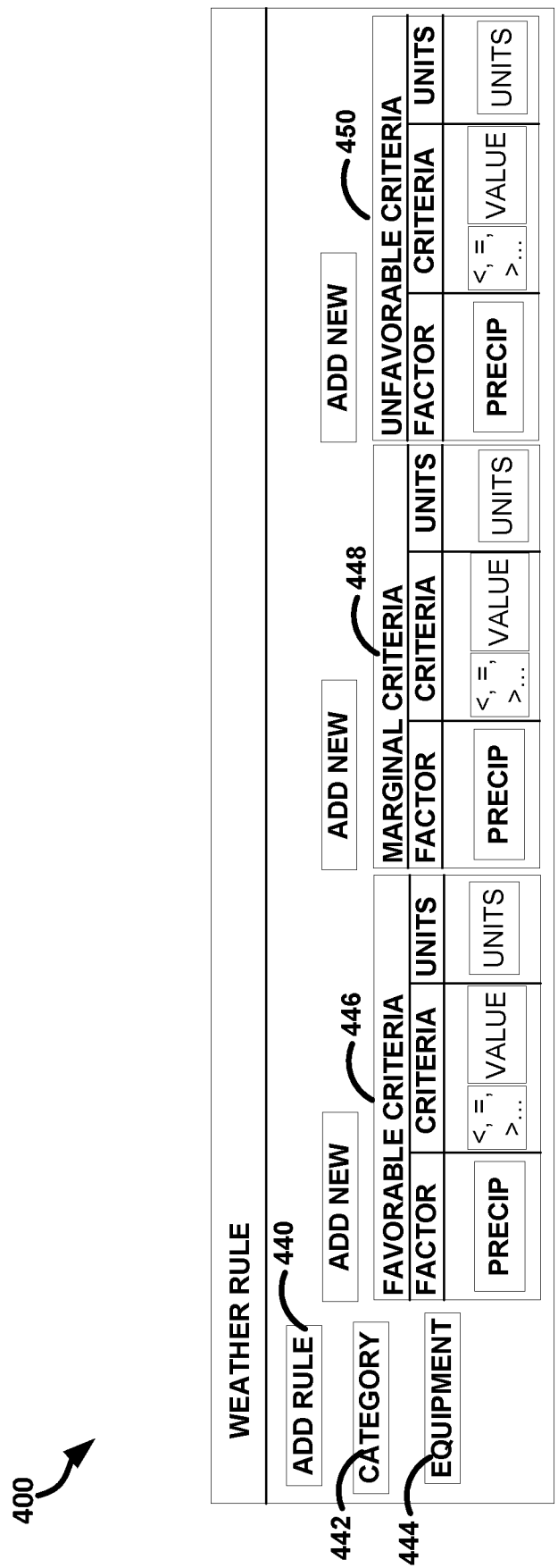
FIG. 4 illustrates, by way of example, a diagram of a user interface for user-defined rule generation.

FIG. 4 illustrates, by way of example, a diagram of a user interface 400 for generating an environmental condition impact rule. Using the user interface 400, a user can define, for specified equipment, rules. Each rule can indicate whether operation of the equipment is favorable, unfavorable, or marginal. Note while these teachings use three categories (marginal, favorable, and unfavorable), more or fewer categories can be defined. Each rule, in the example of FIG. 4, includes three categories, but a user can leave one or more of them blank. If a rule is not completely defined by the user's input or is in conflict with itself or another rule, the processing circuitry 111 can generate an alert to the user.

The conflict can be identified by mapping the thresholds on a decision tree, where each level of the tree represents a specific environmental condition parameter, and a node on a level represents a range of values for that parameter. Every rule can be placed within this decision tree (if a rule does not refer to a parameter, then the rule can be applied to the full range of values for that parameter). The leaf nodes can store the result of the rule firing based on the parameters and range of values defined on the path from the root of the tree to the leaf node. The leaf node stores a list of the rules and their or more corresponding threshold values, a comparison criteria, and units of the threshold values. The factor can define the environmental condition parameter, whether gathered directly from the weather data model 102 or derived from the data 106. The comparison criteria can indicate the mathematical operation to be performed in determining whether the criteria is met. Example comparison criteria include greater than (>), less than (<), equals (=), or a meaningful combination thereof. The units can indicate the units to be compared. If the units of the factor do not match the units of the rule, the processing circuitry 111 can convert the corresponding environmental condition data to the units of the rule to perform the comparison, provided the units are in the same measurement family. The user interface can restrict the available units based on the chosen parameter so that the user cannot form a rule that incorrectly compares quantities from different families of measurement.

The user interface 400 allows the user to define one or more rules per equipment and per category of equipment. For example, a first rule can be defined regarding precipitation amount, a second rule can be defined regarding wind speed, a third rule can be defined regarding density altitude, and so on. Fewer or more rules can be defined in such a way.

The rules are flexible and can be specified by the user. Example rules are provided to aid in understanding but are non-limiting. Table 1 illustrates an example of some user-defined equipment operation rules.

TABLE 1 small sample of some user-defined, weather-based, and equipment-specific rules.

| EQUIPMENT | FAVORABLE | MARGINAL | UNFAVORABLE |
|---|---|---|---|
| Rotaty wing | Ceiling >= 1000 ft | 500 ft < ceiling <1000 ft | Ceiling <= 500 ft |
| Aerial reconnaissance | Wind speed <60 kt | | Wind speed >= 60 kt |
| Close Air Support Close Air Support Close Air Support | Ceiling >= 10000 ft | 5000 ft < ceiling <10000 ft Thunderstorm potential >= 47% Wind speed >= 30 kt and relative humidity <30% | Ceiling <= 5000 ft |
| Aerial reconnaissance Aerial reconnaissance | Ceiling >= 5000 ft | 1000 ft < ceiling <5000 ft Windspeed >= 30 kt and relative humidity <30% | Ceiling < 1000 ft | resulting categories (e.g., favorable, marginal, unfavorable) that are applicable for the parameters and values in this branch of the tree. If any path leads to a leaf node with multiple rules and conflicting categories, the user can be alerted to fix the discrepancies within the conflicting rules for that specific set of parameters and range of values.

The user interface 400 allows a user to add a rule by selecting radio button 440. The user can enter a category in input box 442. The category can indicate a portion of the equipment impacted by the rule being defined. The equipment can be entered in input box 444. The equipment is a broad category of object encompassed by the category. For example, a category can be a trailer for an equipment of vehicle, or a class of vehicle.

The user interface 400 can include input areas 446, 448, 450 through which the user can define their rules. The input areas 446, 448, 450 can be for favorable criteria, marginal criteria, and unfavorable criteria, respectively. The input areas 446, 448, 450 can allow a user to define the factor, one The rules can be stored as a Lambda Expressions in a JavaScript Object Notation (JSON) file or similar. Such a configuration allows for easy implementation, user-configurability and interoperability across software systems.

In some instances, such as when a specific user has not defined a rule for a piece of equipment, a general rule set can be applied for a given location and weather model run. Alternatively, a search of applicable rules that address the user's domain can be conducted to produce a one or more rules that are pertinent. For example, if only specific equipment is located at the user's selected location, then only those rules need to be evaluated to ascertain the environmental condition impact on that equipment. In a planning scenario, a database can be queried to discover what equipment is likely to be in the user's chosen location throughout the forecast period in order to learn what rules need to be applied for the given time frame.

In some instances, the user interface 110 can provide a user with a view of a map. The map can indicate locations for which current weather model data is available, past weather model data is available, no weather model data is available, or a combination thereof.

Figure 5:
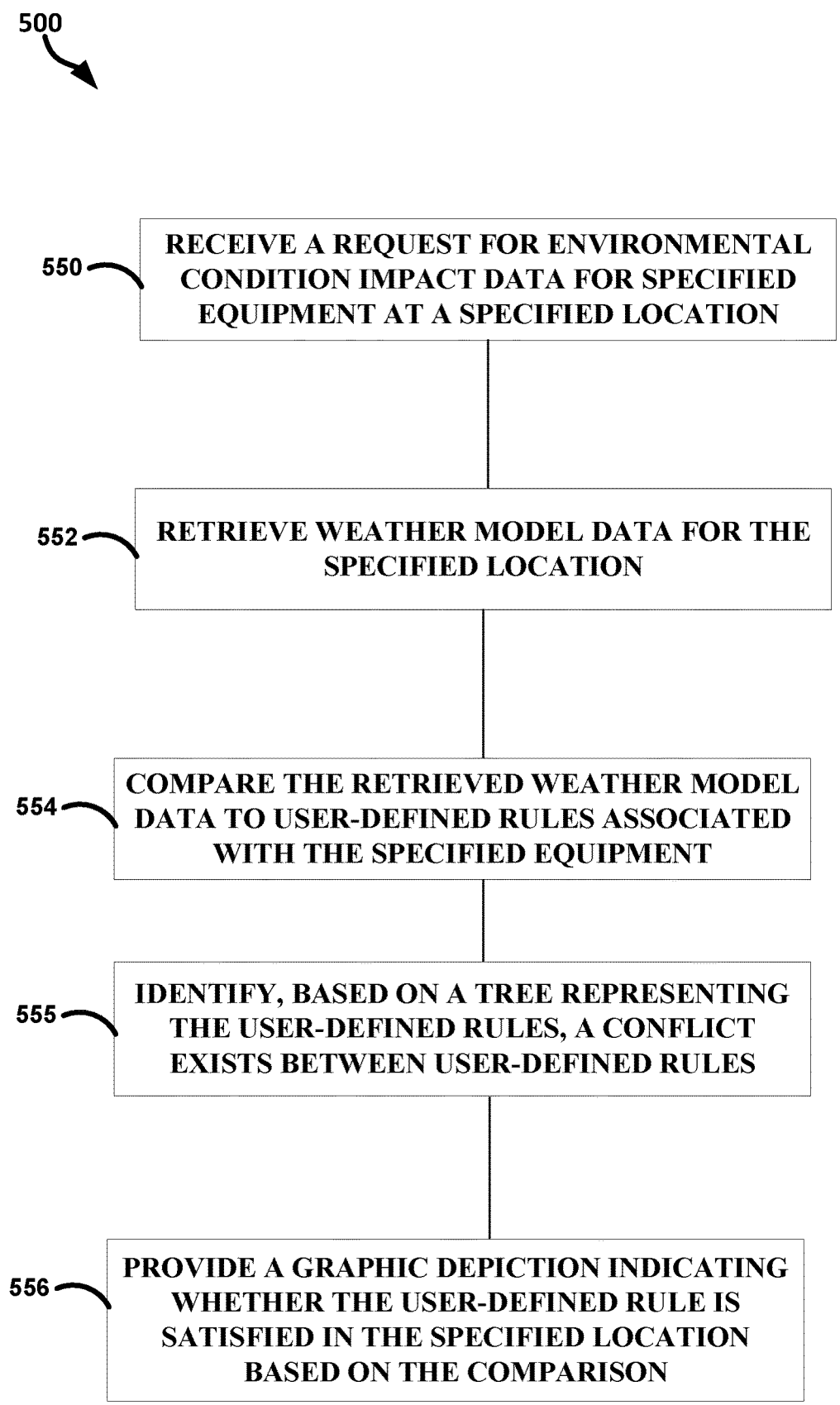
FIG. 5 illustrates, by way of example, a diagram of a method for rule-based environmental condition impact assessment.

FIG. 5 illustrates, by way of example, a diagram of a method 500 for rule-based environmental condition impact assessment. The method 500 as illustrated includes receiving, by a user interface, a request for environmental condition impact data for specified equipment at a specified location, at operation 550; retrieving weather model data for the specified location, at operation 552; comparing the retrieved weather model data to user-defined rules associated with the specified equipment, at operation 554; identifying, based on a tree representing the user-defined rules, a conflict exists between user-defined rules, at operation 555; and providing, by the user interface, a graphic depiction indicating whether the user-defined rule is satisfied in the specified location based on the comparison, at operation 556.

The method 500 can further include, wherein the weather model data includes gridded binary format (GRIB) data. The method 500 can further include, wherein the user-defined rule indicates, for each of a plurality of operation conditions, an environmental condition parameter, a comparison criteria, a threshold value, and a measurement unit associated with the threshold value.

The method 500 can further include, wherein the plurality of operation conditions include two or more of favorable, marginal, or unfavorable. The method 500 can further include, wherein the graphic depiction includes, for the specified equipment and each of a plurality of timeslots, a first visual encoding indicating a most severe operation condition satisfied by the weather model data based on the user-defined rules, wherein favorable is less severe than marginal, and marginal is less severe than unfavorable. The method 500 can further include, wherein the graphic depiction includes, for each time slot with an operation condition severity greater than favorable, a second visual encoding indicating a user-specified rule of the user-specified rules that caused the severity to be greater than favorable.

The method 500 can further include deriving environmental condition parameters and providing, along with the graphic depiction, a summary of the derived weather parameters for the day. The method 500 can further include providing an alert to the user indicating that conflict exists and the rules that are in conflict. The method 500 can further include, wherein the environmental conditions include meteorological and astronomical factors.

Using the systems, devices, methods, computer-readable media, or a combination thereof, of these teachings, a user can be provided with an analysis of whether operating their equipment along the set of areas or regions in a given time frame is feasible. Using the systems, devices, methods, computer-readable media, of a combination thereof, of these teachings, the user can identify a piece of equipment most feasible for traversing the set of areas or regions.

Consider an instance in which a user desires to travel from point A to point B in a given time frame. The user can input their starting location and ending location. The user can specify that they have multiple pieces of equipment capable of traversing from point A to point B. The teachings can identify one or more paths (e.g., roadways, trails, waterways, or the like) between point A and point B. The teachings can determine, for a number of locations between (and including) point A and point B, the prevailing environmental conditions. The teachings can consider user-provided rules, pre-determined or default rules, or a combination thereof, and provide the user with a graphic that provides a visualization of the risks associated with traversing from point A to point B using each piece of equipment. Armed with this information, the user can then decide which piece of equipment (if any) to use in traversing from point A to point B. The multiple pieces of equipment can be different types of vehicles associated with different rules. For example, the vehicles can include different types of drones associated with different rules. In another example, the vehicles can include different types of manned vehicles associated with different rules. The user can thus use the equipment with a higher likelihood of a safe journey from point A to point B (e.g., with or without the user coming along on the journey). Similarly, the teachings can determine the impact on equipment that is at a fixed location over a period of time.

Figure 6:
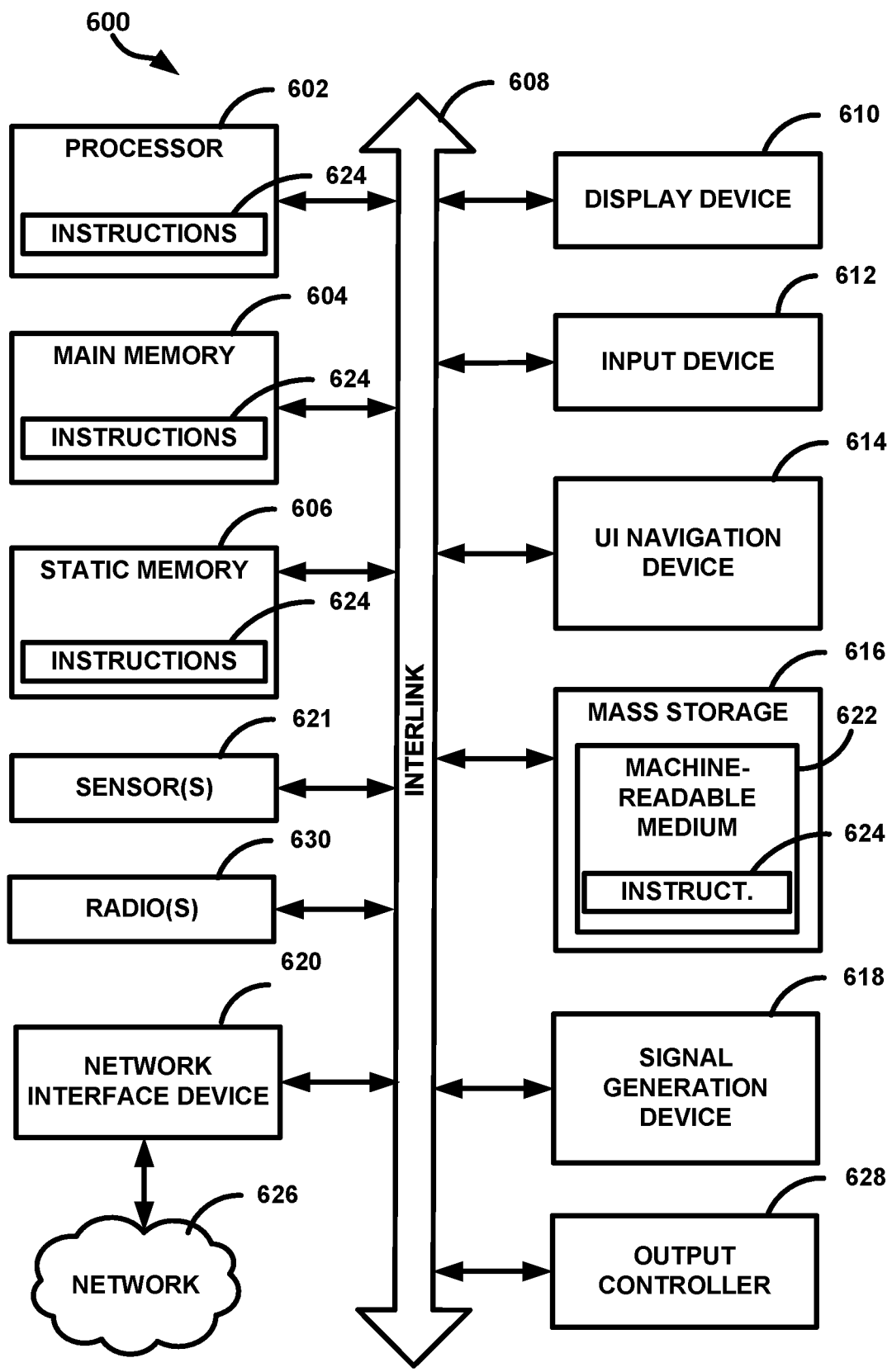
FIG. 6 illustrates, by way of example, a block diagram of an embodiment of a machine in the example form of a computer system within which instructions, for causing the machine to perform any one or more of the methodologies discussed herein, may be executed.

FIG. 6 illustrates, by way of example, a block diagram of an embodiment of a machine in the example form of a computer system within which instructions, for causing the machine to perform any one or more of the methodologies discussed herein, may be executed. The processing circuitry 111 can include or be implemented using one or more components of the machine 600. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPL) or both), a main memory 604 and a static memory 606, which communicate with each other via a. bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth. WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated. with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

Example 1 can include a computer-implemented method for environmental condition impact assessment visualization, the method comprising receiving, by a user interface, a request for environmental condition impact data for specified equipment at a specified location, retrieving weather model data for the specified location, comparing the retrieved weather model data to user-defined rules associated with the specified equipment, and providing, by the user interface, a graphic depiction indicating whether the user-defined rule is satisfied in the specified location based on the comparison.

In Example 2, Example 1 can further include, wherein the weather model data includes gridded binary format (GRIB) data.

In Example 3, at least one of Examples 1-2 can further include, wherein the user-defined rule indicates, for each of a plurality of operation conditions, an environmental condition parameter, a comparison criteria, a threshold value, and a measurement unit associated with the threshold value.

In Example 4, Example 3 can further include, wherein the plurality of operation conditions include two or more of favorable, marginal, or unfavorable.

In Example 5, Example 4 can further include, wherein the graphic depiction includes, for the specified equipment and each of a plurality of timeslots, a first visual encoding indicating a most severe operation condition satisfied by the weather model data based on the user-defined rules, wherein favorable is less severe than marginal, and marginal is less severe than unfavorable.

In Example 6, Example 5 can further include, wherein the graphic depiction includes, for each time slot with an operation condition severity greater than favorable, a second visual encoding indicating a user-specified rule of the user-specified rules that caused the severity to be greater than favorable.

In Example 7, at least one of Examples 1-6 can further include deriving environmental condition parameters and providing, along with the graphic depiction, a summary of the derived weather parameters for the day.

In Example 8, at least one of Examples 1-7 can further include identifying, based on a tree representing user-defined rules, a conflict exists between user-defined rules, and providing an alert to the user indicating that conflict exists and the rules that are in conflict.

In Example 9, at least one of Examples 1-8 can further include, wherein the environmental conditions include meteorological and astronomical factors, In Example 10 at least one of Examples 1-9 can be implemented using a machine-readable medium including instructions thereon that, when executed by a machine, cause the machine to perform the method.

In Example 11 at least one of Examples 1-9 can be implemented using a memory, processing circuitry, and a display configured to perform the method.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method for environmental condition impact assessment visualization, the method comprising:
   receiving, by a graphical user interface, a request for environmental condition impact data for specified equipment at a specified location;
   retrieving weather model data for the specified location;
   comparing the retrieved weather model data to user-defined rules associated with the specified equipment, the user-defined rules defining constraints based on environmental condition parameters;
   identifying, based on a tree representing the user-defined rules in which (i) each level of the tree represents a specific environmental condition parameter of the environmental condition parameters and a node on a respective level represents a range of values for the specific environmental condition parameter and (ii) leaf nodes store a result of a user-defined rule firing based on the environmental condition parameters, a conflict exists between user-defined rules; and
   providing, by the user interface, an alert indicating that the conflict exists and the rules that are in conflict and a graphic depiction indicating whether each of the user-defined rules is satisfied in the specified location based on the comparison.

2. The computer-implemented method of claim 1, wherein the weather model data includes gridded binary format (GRIB) data.

3. The computer-implemented method of claim 1, wherein each of the user-defined rules indicates, for each of a plurality of operation conditions, an environmental condition parameter of the environmental condition parameters, a comparison criteria, a threshold value, and a measurement unit associated with the threshold value.

4. The computer-implemented method of claim 3, wherein the plurality of operation conditions include two or more of favorable, marginal, or unfavorable.

5. The computer-implemented method of claim 4, wherein the graphic depiction includes, for the specified equipment and each of a plurality of timeslots, a first visual encoding indicating a most severe operation condition satisfied by the weather model data based on the user-defined rules, wherein favorable is less severe than marginal, and marginal is less severe than unfavorable.

6. The computer-implemented method of claim 5, wherein the graphic depiction includes, for each time slot with an operation condition severity greater than favorable, a second visual encoding indicating a user-specified rule of the user-specified rules that caused the severity to be greater than favorable.

7. The computer-implemented method of claim 1, further comprising deriving the environmental condition parameters and providing, along with the graphic depiction, a summary of the derived environmental conditionparameters for the day.

8. The computer-implemented method of claim 1, wherein the environmental condition parameters include meteorological and astronomical factors.

9. A non-transitory machine-readable medium including instructions that, when executed by a machine, cause the machine to perform operations for environmental condition impact assessment visualization, the operations comprising:
receiving a request for environmental condition impact data for specified equipment at a specified location;
retrieving weather model data for the specified location;
comparing the retrieved weather model data to user-defined rules associated with the specified equipment, the user-defined rules defining constraints based on environmental condition parameters;
identifying, based on a tree representing the user-defined rules in which (i) each level of the tree represents a specific environmental condition parameter of the environmental condition parameters and a node on a respective level represents a range of values for the specific environmental condition parameter and (ii) leaf nodes store a result of a user-defined rule firing based on the environmental condition parameters, a conflict exists between user-defined rules; and
providing an alert to the user indicating that the conflict exists and the rules that are in conflict and a graphic depiction indicating whether each of the user-defined rules is satisfied in the specified location based on the comparison.

10. The non-transitory machine-readable medium of claim 9, wherein the weather model data includes gridded binary format (GRIB) data.

11. The non-transitory machine-readable medium of claim 9, wherein each of the user-defined rules indicates, for each of a plurality of operation conditions, an environmental condition parameter of the environmental condition parameters, a comparison criteria, a threshold value, and a measurement unit associated with the threshold value.

12. The non-transitory machine-readable medium of claim 11, wherein the plurality of operation conditions include two or more of favorable, marginal, or unfavorable.

13. The non-transitory machine-readable medium of claim 12, wherein the graphic depiction includes, for the specified equipment and each of a plurality of timeslots, a first visual encoding indicating a most severe operation condition satisfied by the weather model data based on the user-defined rules, wherein favorable is less severe than marginal, and marginal is less severe than unfavorable.

14. The non-transitory machine-readable medium of claim 13, wherein the graphic depiction includes, for each time slot with an operation condition severity greater than favorable, a second visual encoding indicating a user-specified rule of the user-specified rules that caused the severity to be greater than favorable.

15. A system for environmental condition impact assessment visualization comprising:
processing circuitry;
a memory including user-defined rules specifying environmental conditions and associated specified equipment at a specified location, the user-defined rules provided by a user and indicating various operating conditions of various severity based on environmental condition parameters, the memory further including instructions stored thereon that, when executed by the processing circuitry, cause the processing circuitry to perform operations comprising:
receiving a request for environmental condition impact data for the specified equipment at a specified location;
retrieving weather model data for the specified location;
identifying, based on a tree representing the user-defined rules in which (i) each level of the tree represents a specific environmental condition parameter of the environmental condition parameters and a node on a respective level represents a range of values for the specific environmental condition parameter and (ii) leaf nodes store a result of a user-defined rule firing based on the environmental condition parameters, a conflict exists between user-defined rules; and
comparing the retrieved weather model data to the user-defined rules; and
a display configured to provide an alert to the user indicating that the conflict exists and the rules that are in conflict and a graphic depiction indicating whether each of the user-defined rules is satisfied in the specified location based on the comparison.

16. The system of claim 15, wherein the operations further comprise deriving environmental condition parameters and providing, along with the graphic depiction, a summary of the derived weather parameters for the day.

17. The system of claim 15, wherein the environmental condition parameters include meteorological and astronomical factors.

18. The system of claim 15, wherein:
the user-defined rule indicates, for each of a plurality of operation conditions, an environmental condition parameter of the environmental condition parameters, a comparison criteria, a threshold value, and a measurement unit associated with the threshold value;
the plurality of operation conditions include two or more of favorable, marginal, or unfavorable;
the graphic depiction includes, for the specified equipment and each of a plurality of timeslots, a first visual encoding indicating a most severe operation condition satisfied by the weather model data based on the user-defined rules, wherein favorable is less severe than marginal, and marginal is less severe than unfavorable; and the graphic depiction includes, for each time slot with an operation condition severity greater than favorable, a second visual encoding indicating a user-specified rule of the user-specified rules that caused the severity to be greater than favorable.

\* \* \* \* \*